United States Patent
Moriwaki et al.

(10) Patent No.: US 11,979,694 B2
(45) Date of Patent: May 7, 2024

(54) OPTICAL AND ELECTRONIC INTEGRATED SWITCH

(71) Applicant: Nippon Telegraph and Telephone Corporation, Tokyo (JP)

(72) Inventors: Osamu Moriwaki, Musashino (JP); Shunichi Soma, Musashino (JP); Keita Yamaguchi, Musashino (JP); Kenya Suzuki, Musashino (JP); Seiki Kuwabara, Musashino (JP); Tetsuro Inui, Musashino (JP); Shuto Yamamoto, Musashino (JP); Seiji Okamoto, Musashino (JP); Hideki Nishizawa, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 9 days.

(21) Appl. No.: 17/795,603

(22) PCT Filed: Jan. 30, 2020

(86) PCT No.: PCT/JP2020/003471
§ 371 (c)(1),
(2) Date: Jul. 27, 2022

(87) PCT Pub. No.: WO2021/152782
PCT Pub. Date: Aug. 5, 2021

(65) Prior Publication Data
US 2023/0073384 A1    Mar. 9, 2023

(51) Int. Cl.
*H04Q 11/00* (2006.01)
(52) U.S. Cl.
CPC ............................ *H04Q 11/0071* (2013.01)

(58) Field of Classification Search
CPC ............ H04Q 11/0071; H04Q 11/0005; H04Q 11/0001; H04Q 3/00; H04Q 3/0016; H04Q 5/00; H04L 45/56; H04B 10/40
See application file for complete search history.

(56) References Cited

U.S. PATENT DOCUMENTS

| | | | |
|---|---|---|---|
| 2023/0060777 A1* | 3/2023 | Yamaguchi | H04L 45/56 |
| 2023/0082854 A1* | 3/2023 | Nishizawa | H04B 10/61 398/208 |
| 2023/0136142 A1* | 5/2023 | Moriwaki | H04Q 11/0005 385/16 |

FOREIGN PATENT DOCUMENTS

| | | | |
|---|---|---|---|
| JP | 2012-248925 A | | 12/2012 |
| JP | 2012248925 A | * | 12/2012 |

OTHER PUBLICATIONS

Consortium for On-Board Optics, *Using On-Board Optics for Networking Technology Innovation*, COBO Release 1.0 Whitepaper (http://onboardoptics.org/wp-content/uploads/2019/05/COBO-CohOBO-AppNote-March-2018.pdf), Mar. 2018, pp. 1-8.

(Continued)

*Primary Examiner* — Hibret A Woldekidan
(74) *Attorney, Agent, or Firm* — Workman Nydegger

(57) ABSTRACT

An optical and electronic integrated switch includes a network processor that controls the functions of the packet switch, a plurality of optical transceivers having photoelectric conversion functions, and a plurality of optical switches. The optical switches include different types of optical core switch and a plurality of optical-path selection switches. The optical transceivers provided near the processor have a regenerative relay function that regenerates optical signals and turns back the optical signals, and perform optical communication with a communication counterpart via the optical switches. In the optical communication, optical switches of the different types can cooperate to set paths for (Continued)

optical cut-through in which path selection is performed such that inputted optical signals are outputted without the intervention of the processor. This optical cut-through can be effectively performed without imposing a signal processing burden that consumes electric power on the processor.

7 Claims, 6 Drawing Sheets

(56) References Cited

OTHER PUBLICATIONS

A COBO White Paper, *Optical Connectivity Options for 400 Gbps and Higher On-Board Optics*, Revision 1.0 (http://onboardoptics.org/wp-content/uploads/2019/03/COBO-Optical-Connectivity-Whitepaper-March-2019.pdf), Mar. 2019 1-41.
Ken-ichi Sato, et al., *GMPLS-Based Photonic Multilayer Router (Hikari Router) Architecture: An Overview of Traffic Engineering and Signaling Technology*, NTT Corporation (IEEE Commun. Mag., vol. 40, Mar. 2002.) pp. 96-101.

\* cited by examiner

OPTICAL AND ELECTRONIC INTEGRATED SWITCH

TECHNICAL FIELD

The present invention relates to a high-performance optical and electronic integrated switch belonging to network switches.

BACKGROUND ART

Nowadays, electronic-circuit-based packet switches are often used for network switches used for the Internet. An example of an electronic circuit that controls this packet switch is a network processor, the capacity of which tends to increase year by year. The capacity of this network processor is determined by the value obtained by multiplying the signal speed by the number of ports. However, the increase in the capacity of the network processor increases the number of signals inputted to and outputted from the network processor, requiring an increase of the number of wiring lines (which may be called electrical wiring) through which electrical signals used for the input and output pass or an increase of the signal speed.

The higher the signal speed of the signals propagating through electrical wiring, the shorter the propagable distance of the signals, while the density of electrical wiring cannot be increased beyond the physical upper limit. For this reason, a further increase in the capacity of the network processor makes it difficult even to propagate electrical signals to the distance within the board or so. Under these circumstances, it is being studied to convert electrical signals into optical signals within the propagable distance and use optical wiring which is capable of long-distance transmission compared to electrical signals. Note that techniques related to the above description are disclosed in non-patent literature 1 and non-patent literature 2.

Techniques embodying the above study points are also being proposed. For example, non-patent literature 1 discloses an optical transceiver used for such applications that electronic circuits such as a network processor and optical transceivers having photoelectric conversion functions are provided side by side on a substrate and that these electronic circuits and optical transceivers are connected to one another with metal wiring or the like formed of an electrical conductor.

FIG. 1 is a top view diagram illustrating a schematic configuration for the case in which a technique disclosed in non-patent literature 1 is applied to a network switch 10. With reference to FIG. 1, this network switch 10 includes, on the upper surface of a substrate 1, a network processor 2 and an optical transceiver 3 having a photoelectric conversion function, and these devices are connected to one another with metal wiring 4. The network processor 2 is an electronic circuit that provides core functions of the packet switch, and is typically configured as an application specific integrated circuit (ASIC) in many cases. The optical transceiver 3 is a small component including an optical receiver (RX) 3a configured inside as a module, a laser (LASER) 3b, an electrical-processing function unit 3c, and an optical transmitter (TX) 3d, and also includes a connector 3e, optical fibers 3f, and the like. This optical transceiver 3 enables a plurality of optical transceivers 3 to be arranged side by side on the substrate 1 and thereby achieve high-density packaging like tiles.

As for the optical transceiver 3, the optical receiver 3a, in the case of coherent detection, plays roles of selectively enhancing the optical signals having wavelengths close to that of the laser 3b out of the optical signals inputted from the connected optical fiber 3f and converting the enhanced optical signals into electrical signals by optical-electrical conversion. The electrical-processing function unit 3c plays roles of performing electrical-signal digital signal processing at the time when signals are sent to or received from the network processor 2 and amplifying electrical signals at the time of transmission and reception of optical signals. The optical transmitter 3d plays roles of performing electrical-optical conversion by modulating the light inputted from the laser 3b using electrical signals inputted from the electrical-processing function unit 3c, and outputting the resultant signals to the connected optical fiber 3f. The connector 3e is provided for the connection with the network processor 2.

In general, the packet switching function provided by the network processor 2 is a highly functional one that can specify a destination for each packet but consumes a large amount of electric power per processing capacity. Meanwhile, the optical switch generally requires time for switching paths, and thus the applications of the optical switch are limited to the ones in which paths are fixed or the ones for switching in units of flows that continue for a long time. However, as for the optical switch, the power consumption required for switching is smaller than that of the packet switch, and it is not dependent on the signal speed and has an approximately constant value.

Nowadays, to reduce electric power consumed in the optical network, the optical switches and the packet switch are combined, and a method is devised for the case in which the amount of signal flow using the same pair of input output ports is large with the traffic passing through the packet switch. Specifically, in such a case, an architecture called optical cut-through is applied in which the flow is not inputted to the packet switch, and paired input output ports are directly connected via optical switches.

Meanwhile, one of the recent demands for optical networks is the shift to the Internet protocol integrated network that links the service layer and the physical layer. In addition, it is important for optical networks that they can provide a large scale, a wide band, and high reliability and be built economically. Network control techniques are also required that are capable of quickly setting an optical physical network for the bandwidth requirement of the Internet protocol. A known technique related to this network control is a research promotion of generalized multi-protocol label switching (GMPLS) disclosed in non-patent literature 3.

In current optical networks, large capacities of switches/routers supporting the Internet protocol inevitably lead to high cost and high power-consumption. To address this, introducing optical switches and applying optical cut-through make it possible to perform dynamic optical path setting and reduce the processing in the switches/routers.

In the case in which an architecture for optical cut-through is applied to a known network switch, it is assumed that optical switches are combined and added to a packet switch having a completed function. However, such a configuration that combines different devices causes problems as follows.

For example, since the packet switch and the optical switches are different devices, even if some devices have similar functions to be mounted, those devices have to be formed separately. This causes a problem of inconvenience that it is impossible to reduce cost by concentrating devices having similar functions at one place in arrangement. For example, as for the packet switch and the optical switches, even in the case in which devices having a function of transmitting and receiving optical signals are similar to devices having an optical transmission reception function of optical transceivers, these similar devices have to be formed separately in the packet switch and the optical switches.

Further, since the packet switch and the optical switches are separate devices, it is necessary, for example, to provide timing margins, and it causes a problem that extra communication processing time is necessary. For example, since it is necessary to prevent unexpected packet losses or the like when changing the paths of optical switches, the control order and control timing of the packet switch and the optical switches have to be adjusted. However, in the case in which the packet switch and the optical switches are separate devices, if control procedures are sequentially executed at fixed timings without providing a timing margin, it can be a factor of packet losses. To avoid such a situation, if measures are taken such as executing the next control procedure after checking the previous processing result, it requires a considerably unnecessary communication processing time.

In brief, applying an architecture for optical cut-through to an existing network switch has a problem caused because the packet switch and the optical switches are separate devices. The problem is that it is difficult to make it possible to integrate the packet switch and the optical switches to concentrate devices having similar functions in arrangement and reduce communication processing time.

CITATION LIST

Non-Patent Literature

Non-Patent Literature 1: "Consortium For On-Board Optics The Use of On-Board Optic Compliant Modules in Coherent Applications" COBO Release 1.0 Whitepaper (http://onboardoptics.org/wp-content/uploads/2019/05/COBO-CohOBO-AppNote-March-2018.pdf)

Non-Patent Literature 2: "Optical Connectivity Options for 400 Gbps and Higher On-Board Optics" COBO Connectivity Whitepaper, Revision 1.0 (http://onboardoptics.org/wp-content/uploads/2019/03/COBO-Optical-Connectivity-Whitepaper-March-2019.pdf)

Non-Patent Literature 3: "GMPLS-Based Photonic Multilayer Rouer (Hikari Rouer) Architecture: An Overview of Traffic Engineering and Signaling Technology" Ken-ichi Sato, Naoaki Yamanaka, Yoshihiro Takigawa, Masafumi Koga, Satoru Okamoto, Kohei Shiomoto, Eiji Oki, and Wataru Imajuku, NTT Corporation (IEEE Commun. Mag., vol. 40, pp. 96-101, March 2002.)

SUMMARY OF THE INVENTION

The present invention has been made to solve the foregoing problems. A main object of the embodiments according to the present invention is to provide an optical and electronic integrated switch that makes it possible to integrate a packet switch and optical switches to concentrate devices having similar functions in arrangement and reduce communication processing time.

An aspect of the present invention to achieve the above main object is an optical and electronic integrated switch including a packet switch and a plurality of optical switches, in which the packet switch includes an electronic circuit and a plurality of optical transceivers provided near the electronic circuit and having a photoelectric conversion function, the plurality of optical switches include different types of optical switches, paths connecting between the electronic circuit and the plurality of optical transceivers are formed of wiring through which an electrical signal passes, paths connecting between the plurality of optical transceivers and the plurality of optical switches, paths connecting between two optical switches of the different types out of the plurality of optical switches, and paths connecting between the plurality of optical switches and an input-output port of the optical and electronic integrated switch are formed of optical waveguides, and the optical switches of the different types out of the plurality of optical switches cooperate to perform path selection such that an inputted optical signal is outputted without intervention of the electronic circuit.

In the optical and electronic integrated switch having the above configuration, the optical transceivers near the electronic circuit in the packet switch perform optical communication with a communication counterpart via the optical switches. In this optical communication, different types of optical switches, out of the optical switches, cooperate to perform path selection, making it possible to perform optical cut-through effectively without imposing a burden on electronic circuits. With these configurations and functions of the optical and electronic integrated switch, it is possible to integrate the packet switch and the optical switches to concentrate devices having similar functions in arrangement and reduce communication processing time.

DESCRIPTION OF EMBODIMENTS

Hereinafter, optical and electronic integrated switches according to several embodiments of the present invention will be described in detail with reference to the drawings.

Figure 2:
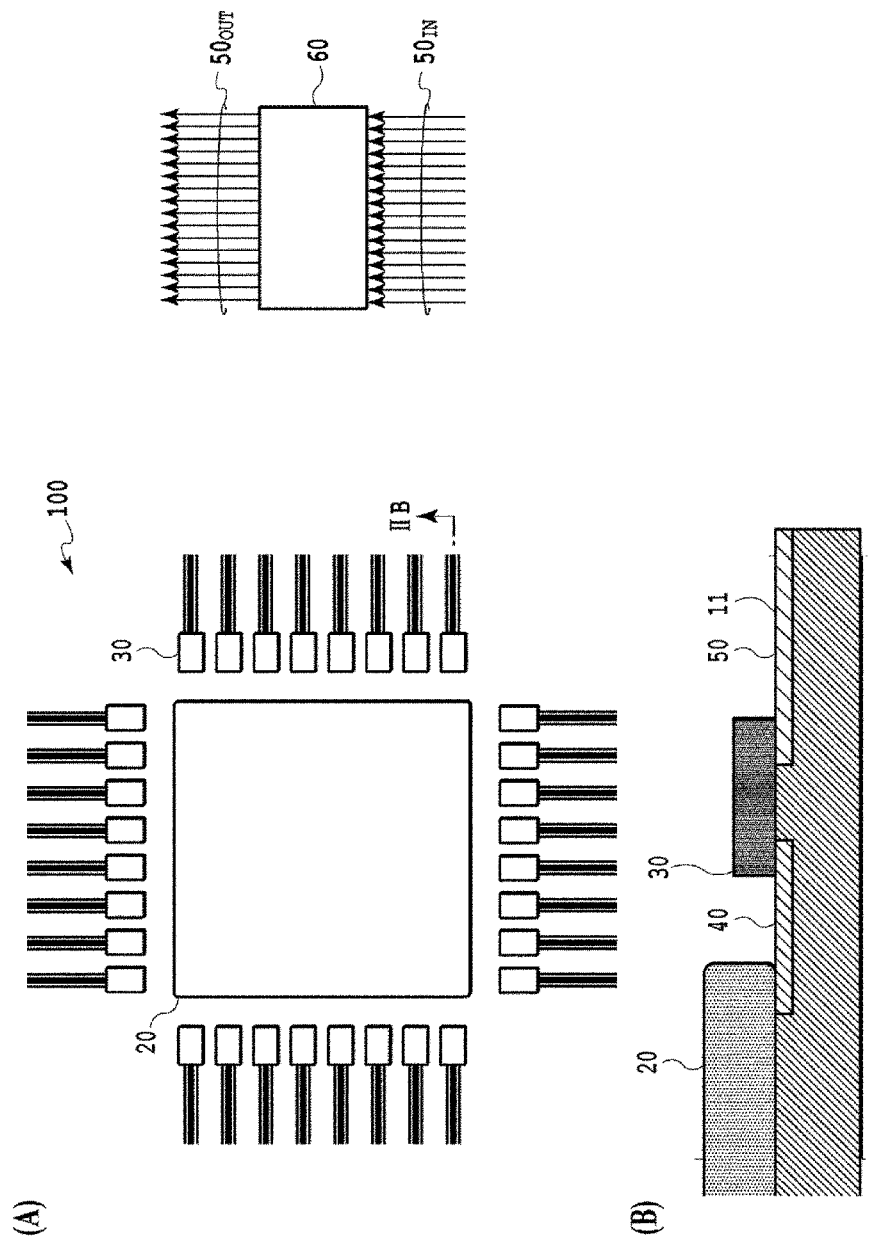
FIG. 2 is a diagram illustrating a schematic configuration of an optical and electronic integrated switch according to a preferred embodiment of the present invention. Part (A) is a plan view of the optical and electronic integrated switch from the upper surface direction. Part (B) is a side cross-sectional view from the arrow IIB direction of a portion of part (A) in a state in which the optical and electronic integrated switch is formed on a substrate.

First, a technical overview of the optical and electronic integrated switch according to a preferred embodiment of the present invention will be briefly described with reference to FIG. 2. FIG. 2 is a diagram illustrating a schematic configuration of an optical and electronic integrated switch 100 according to the preferred embodiment of the present invention. FIG. 2(A) is a plan view of the optical and electronic integrated switch 100 from the upper surface direction. FIG. 2(B) is a side cross-sectional view from the arrow IIB direction of a portion of FIG. 2(A) in a state in which the optical and electronic integrated switch 100 is formed on a substrate 11.

Figure 1:
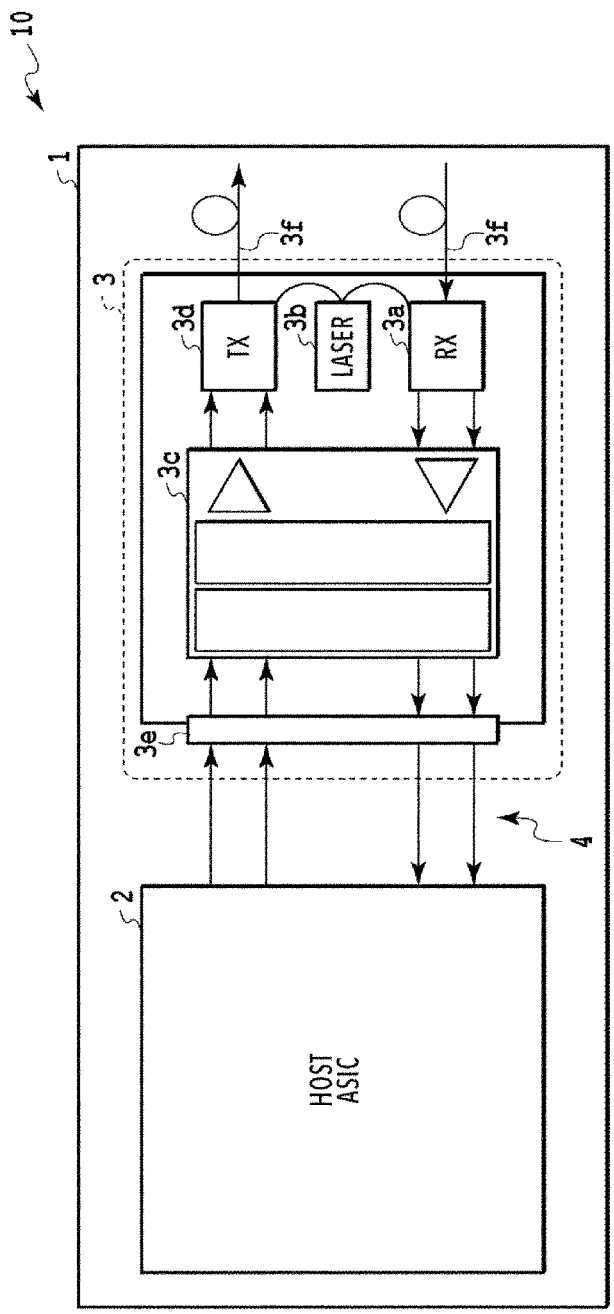
FIG. 1 is a top view diagram illustrating a schematic configuration of a network switch disclosed in non-patent literature 1.

With reference to FIGS. 2(A) and 2(B), the optical and electronic integrated switch 100 includes a network processor 20 and a plurality of optical transceivers 30 having photoelectric conversion functions, the network processor 20 and the plurality of optical transceivers 30 composing a packet switch, and the optical and electronic integrated switch 100 also includes a plurality of optical switches. Of these, the network processor 20 is an electronic circuit that controls the functions of the packet switch and is capable of receiving and outputting a large number of high-speed signals. Each optical transceiver 30 is provided near the network processor 20 and has a configuration the same as or similar to the optical transceiver 3 described with reference to FIG. 1, but to simplify it, only its outer shape is illustrated. As for the optical transceivers 30, at least some of them should preferably be away from the network processor 20 and have a regeneration relay function that converts inputted optical signals into electrical signals, turns back the electrical signals and converts the electrical signals into optical signals by electrical-optical conversion, and outputs the optical signals. Each optical switch should preferably be a waveguide optical switch made by using planar lightwave circuit (PLC) techniques. The optical switches include different types of optical switches. Then, different types of optical switches, out of the optical switches, cooperate to perform path selection such that inputted optical signals are outputted without the intervention of the network processor 20, which operation is called optical cut-through. Examples of different types of optical switches include not only an optical core switch 60 illustrated in FIG. 2 but also various types such as path selection switches and path setting switches.

In this optical and electronic integrated switch 100, metal wiring 40 which is wiring through which electrical signals pass is used for the paths connecting between the network processor 20 and the optical transceivers 30. For the paths connecting between the optical transceivers 30 and the optical switches, optical waveguides 50 are used. These optical waveguides 50 should also preferably be used for the paths connecting between two optical switches of different types out of the optical switches and the paths connecting between the optical transceivers 30 or optical switches and the input-output ports. In addition, routing of the traces of pattern of the optical waveguides 50 is actually complicated on the assumption that different types of optical switches are used among the optical switches. Thus, in FIG. 2(A), only the portions of optical waveguides 50IN on the input side and optical waveguides 50OUT on the output side are illustrated regarding the optical core switch 60, and most of them are omitted.

In the optical and electronic integrated switch 100, the network processor 20, the optical transceivers 30, the optical switches, the metal wiring 40, and the optical waveguides 50 are implemented on the upper surface of one and the same substrate 11. Then, the metal wiring 40 and the optical waveguides 50 compose an interposer with optical waveguides. In this implemented state, the network processor 20, the optical transceivers 30, and the optical switches should preferably be arranged in one and the same plane of the upper surface of the interposer with optical waveguides. Note that some or all of the optical switches may be integrated as part of the optical waveguides 50 in the interposer with optical waveguides. In addition, in the area of the optical waveguides 50 of the optical switches, not only the above various types of switches but also optical function devices such as arrayed waveguide gratings (AWG) may be provided.

As for the optical and electronic integrated switch 100 having such an outline configuration, the following describes embodiments for integrating the packet switch and the optical switches to effectively concentrating devices having similar functions in arrangement and for reducing communication processing time. Note that it is assumed that a plurality of optical switches are used in the implementation configuration.

Embodiment 1

Figure 3:
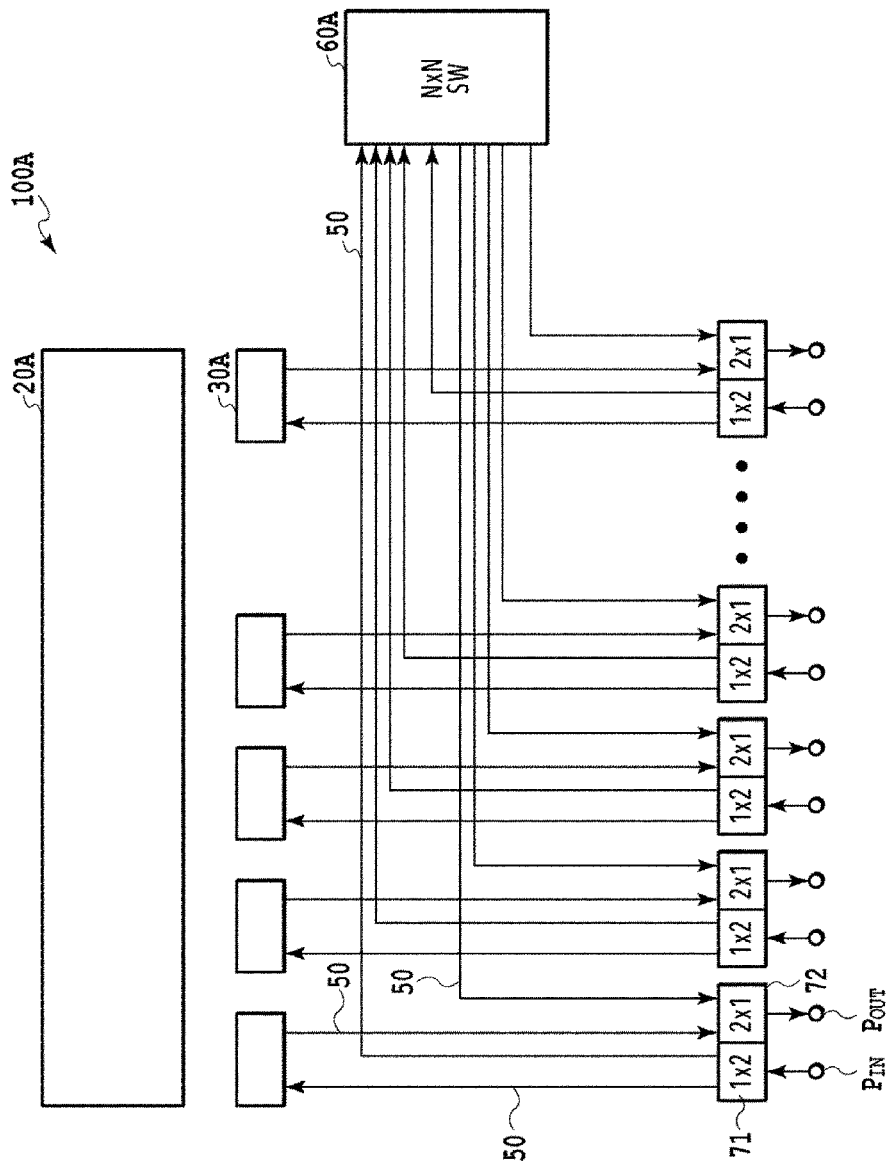
FIG. 3 is a top view diagram illustrating a schematic configuration of an optical and electronic integrated switch according to Embodiment 1 of the present invention.

FIG. 3 is a top view diagram illustrating a schematic configuration of an optical and electronic integrated switch 100A according to Embodiment 1 of the present invention.

With reference to FIG. 3, this optical and electronic integrated switch 100A includes a network processor 20A which is an electronic circuit that controls the functions of the packet switch, a plurality of optical transceivers 30A having photoelectric conversion functions, and a plurality of optical switches. The network processor 20A and the optical transceivers 30A compose the packet switch. Each optical switch includes, as different types of optical switches, an optical core switch 60A, a plurality of first optical-path selection switches 71, and a plurality of second optical-path selection switches 72. Defining the plurality as N (where N is a natural number of two or more), the optical core switch 60A is of an N×N type (N inputs and N outputs). The N×N type means that it has N inputs and N outputs, and the same is true of the following description. In addition, each first optical-path selection switch 71 is connected to an input port $P_{IN}$, and each second optical-path selection switch 72 is connected to an output port $P_{OUT}$.

In this optical and electronic integrated switch 100A, wiring through which electrical signals pass, such as the above metal wiring, is used for the paths connecting between the network processor 20A and the optical transceivers 30A. For the paths connecting between the optical transceivers 30A and the first and second optical-path selection switches 71 and 72, optical waveguides 50 are used. Then, the optical waveguides 50 are also used for the paths connecting between the optical core switch 60A and the first and second optical-path selection switches 71 and 72. Further, the optical waveguides 50 are also used for the paths connecting between the input ports $P_{IN}$ and the first optical-path selection switches 71 and the paths connecting between the output ports $P_{OUT}$ and the second optical-path selection switches 72.

Each optical transceiver 30A converts inputted optical signals into electrical signals and transmits the electrical signals to the network processor 20A, and each optical transceiver 30A also outputs optical signals according to electrical signals from the network processor 20A. Specifically, each optical transceiver 30A converts optical signals inputted from the corresponding input port $P_{IN}$ via the corresponding first optical-path selection switch 71 into electrical signals by optical-electrical conversion and transmits the electrical signals to the network processor 20A. Each optical transceiver 30A converts electrical signals from the network processor 20A into optical signals by electrical-optical conversion and outputs the optical signals to the corresponding output port $P_{OUT}$ via the corresponding second optical-path selection switch 72.

Each first optical-path selection switch 71 can select the direction path through which optical signals inputted from the input port $P_{IN}$ pass through the optical transceiver 30A and are converted into electrical signals by optical-electrical conversion, and the electrical signals are transmitted to the network processor 20A. In addition, each first optical-path selection switch 71 also can select, other than the selection described above, a direction path that directly connects the optical signals via the optical core switch 60A to an output port $P_{OUT}$ different from the paired output port $P_{OUT}$. In other words, each first optical-path selection switch 71 plays a role of selecting one of the two direction paths. Each first optical-path selection switch 71 illustrated in FIG. 3 is of a 1×2 type.

In contrast, each second optical-path selection switch 72 can select the direction path through which electrical signals outputted from the network processor 20A pass through the optical transceiver 30A and are converted into optical signals by electrical-optical conversion, and the optical signals are outputted. In addition, each second optical-path selection switch 72 also can select, other than the selection described above, a direction path through which optical signals inputted from an input port $P_{IN}$ different from the paired input port $P_{IN}$ and passing through the optical core switch 60A are outputted. In other words, each second optical-path selection switch 72 plays a role of selecting one of the two direction paths. Each second optical-path selection switch 72 illustrated in FIG. 3 is of a 2×1 type.

The following describes the basic operation of the optical and electronic integrated switch 100A. Note that for the optical and electronic integrated switch 100A, there is not only the case in which the optical and electronic integrated switch 100A and a communication counterpart, which is a client, communicate with each other but also the case in which two different communication counterparts, which are clients, communicate with each other without regeneration and relay of signals in the middle of the path. For this reason, the distance between the optical and electronic integrated switch 100A and an external signal source of a communication counterpart, which is a client, is approximately half of the distance to which the optical transceiver 30A can transmit. Note that to control the optical switches, techniques can by employed such as directly connecting between the input-output ports according to requests from the client or directly connecting between appropriate input-output ports according to the design by the network operator, but details are not discussed here.

Assume a case in which the first optical-path selection switch 71 selects a direction path. In this case, the optical signals inputted from the input port $P_{IN}$ are transmitted to the optical transceiver 30A or are directly connected via the optical core switch 60A to an output port $P_{OUT}$ different from the output port $P_{OUT}$ paired with the input port $P_{IN}$. In the case in which the optical signals are transmitted to the optical transceiver 30A, the optical signals are converted into electrical signals by optical-electrical conversion, and the electrical signals are transmitted to the network processor 20A.

Assume a case in which the second optical-path selection switch 72 selects a direction path. In this case, optical signals related to the output from the network processor 20A and passing through the optical transceiver 30A or optical signals inputted from an input port $P_{IN}$ other than the paired one and passing through the optical core switch 60A are outputted to the output port Pour. The electrical signals outputted from the network processor 20A pass through the optical transceiver 30A and are converted into optical signals by electrical-optical conversion.

In the optical and electronic integrated switch 100A of Embodiment 1, different types of optical switches, out of the optical switches, can cooperate to set paths for performing a path selection such that inputted optical signals are outputted without intervention of the network processor 20A. This optical cut-through can be effectively performed without imposing a signal processing burden that consumes electric power on the network processor 20A. As a result, it is possible to achieve electric power reduction in the optical network to which the optical and electronic integrated switch 100A is applied as a network switch.

In addition, the optical and electronic integrated switch 100A provides an effect of integrating the packet switch and the optical switches to make it possible to achieve reduction of the communication processing time.

Embodiment 2

Figure 4:
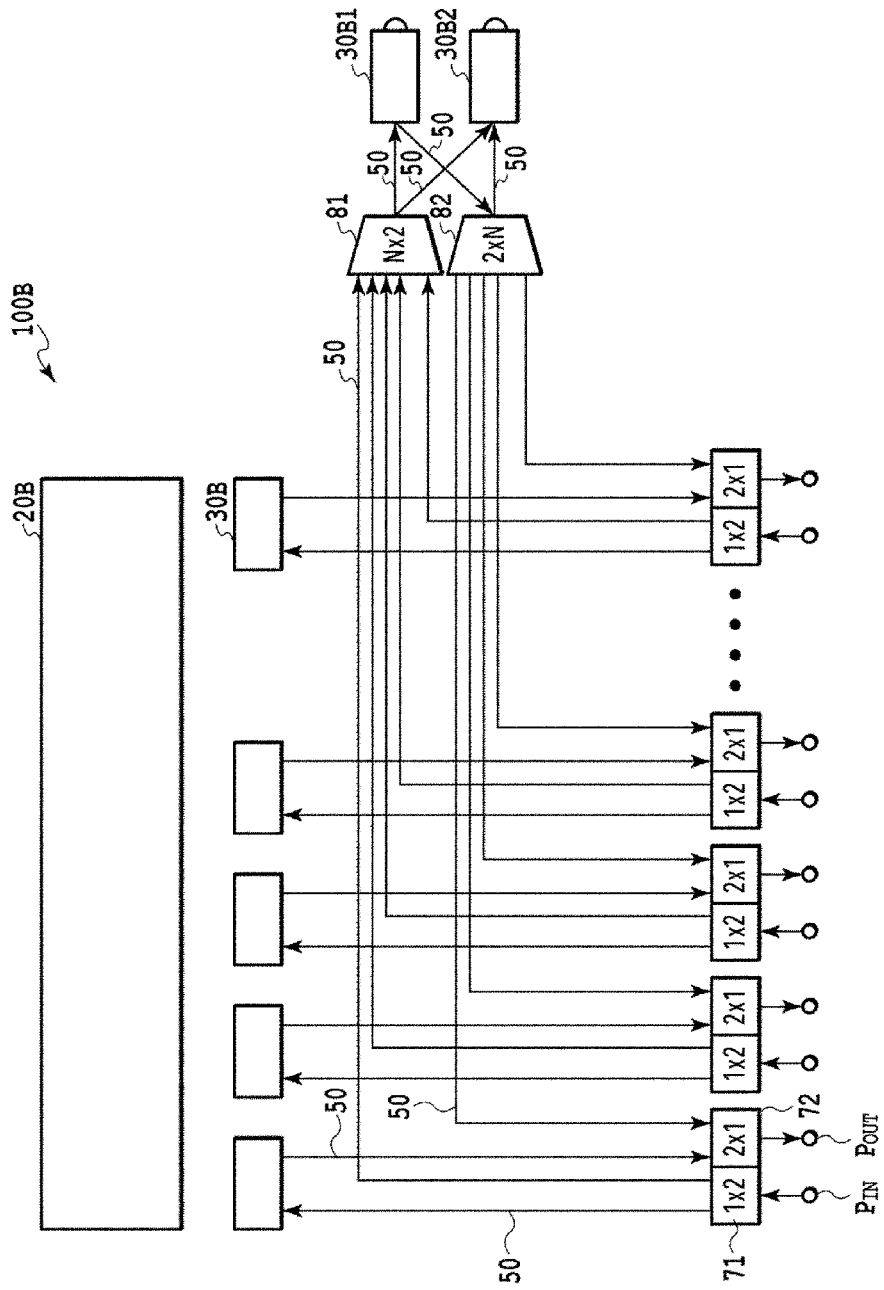
FIG. 4 is a top view diagram illustrating a schematic configuration of an optical and electronic integrated switch according to Embodiment 2 of the present invention.

FIG. 4 is a top view diagram illustrating a schematic configuration of an optical and electronic integrated switch 100B according to Embodiment 2 of the present invention.

With reference to FIG. 4, this optical and electronic integrated switch 100B includes a network processor 20B which is an electronic circuit that controls the functions of the packet switch, a plurality of optical transceivers 30B having photoelectric conversion functions, and a plurality of optical switches. The network processor 20B and the optical transceivers 30B compose the packet switch. In this optical and electronic integrated switch 100B, a pair of optical transceivers 30B1 and 30B2 which are part of the optical transceivers 30B are away from the network processor 20B and have a regeneration relay function that turns back and outputs inputted optical signal to the transmission side.

Each optical switch includes, as different types of optical switches, a plurality of first optical-path selection switches 71, a plurality of second optical-path selection switches 72, a first optical-path setting switch 81, and a second optical-path setting switch 82. Also in this case, each first optical-path selection switches 71 is connected to the input ports $P_{IN}$, and each second optical-path selection switch 72 is connected to the output ports $P_{OUT}$.

In this optical and electronic integrated switch 100B, wiring through which electrical signals pass, such as the above metal wiring, is used for the paths connecting between the network processor 20B and each optical transceiver 30B. For the paths connecting between each optical transceiver 30B and each first and second optical-path selection switch 71 and 72, optical waveguides 50 are used. Further, the optical waveguides 50 are also used for the paths connecting between each first and second optical-path selection switches 71 and 72, the first and second optical-path setting switches 81 and 82, and the optical transceivers 30B1 and 30B2 having regeneration relay functions. In addition, the optical waveguides 50 are also used for the paths connecting between the input ports $P_{IN}$ and the first optical-path selection switches 71 and the paths connecting between the output ports Pour and the second optical-path selection switches 72.

Each first optical-path selection switch 71 can select the direction path through which optical signals inputted from the input port $P_{IN}$ pass through each of the optical transceiver 30B and are converted into electrical signals by optical-electrical conversion, and the electrical signals are transmitted to the network processor 20B. Each first optical-path selection switch 71 also can select, other than the selection described above, a direction path that directly connects the optical signals via the first optical-path setting switch 81 to an output port $P_{OUT}$ different from the paired output port $P_{OUT}$. In other words, each first optical-path selection switch 71 plays a role of selecting one of the two direction paths. Each first optical-path selection switch 71 illustrated in FIG. 4 is also of a 1×2 type.

Each second optical-path selection switch 72 can select the direction path through which electrical signals outputted from the network processor 20B pass through the optical transceiver 30B and are converted into optical signals by electrical-optical conversion, and the optical signals are outputted. Each second optical-path selection switch 72 also can select, other than the selection described above, a direction path through which optical signals inputted from an input port $P_{IN}$ different from the paired input port $P_{IN}$ and passing through the second optical-path setting switch 82 are outputted. In other words, each second optical-path selection switch 72 plays a role of selecting one of the two direction paths. Each second optical-path selection switch 72 illustrated in FIG. 4 is also of a 2×1 type.

The first optical-path setting switch 81 receives optical signals selected by each first optical-path selection switch 71 and outputs them to one of the optical transceivers 30B1 and 30B2 having regeneration relay functions. The first optical-path setting switch 81 is of an N×2 type. The optical transceivers 30B1 or 30B2 turns back the inputted optical signals and transmits them to the second optical-path setting switch 82. The optical signals to be turned back are obtained by further performing electrical-optical conversion on the electrical signals temporality generated by optical-electrical conversion. The second optical-path setting switch 82 outputs the optical signals turned back by the optical transceiver 30B1 or 30B2 having a regeneration relay function to the second optical-path selection switch 72 at a desired location. The second optical-path setting switch 82 is of a 2×N type.

In the optical and electronic integrated switch 100B according to Embodiment 2, the first and second optical-path setting switches 81 and 82 and the optical transceivers 30B1 and 30B2 having regeneration relay functions cooperate to set the paths for the optical cut-through. In this path setting, the paths for optical cut-through in which path selection is performed such that inputted optical signals are outputted without the intervention of the network processor 20B are set for one round-trip line.

The following describes the basic operation of the optical and electronic integrated switch 100B. Here, each optical transceiver 30B in this case includes, as part, the optical transceivers 30B1 and 30B2 having regeneration relay functions that turn back optical signals. For this reason, the distance to an external signal source of a communication counterpart, which is a client, is approximately the distance to which each optical transceiver 30B can transmit. Note that also here the method of controlling each optical switch is not discussed, and the same is true of the following description.

Assume a case in which by the direction-path selection of the first optical-path selection switch 71, the direction path is selected through which the optical signals inputted from the input port $P_{IN}$ are transmitted to the optical transceiver 30B connected to the network processor 20B. In this case, when optical signals are transmitted to the optical transceiver 30B, the optical signals are converted by optical-electrical conversion into electrical signals, which are transmitted to the network processor 20B. Also assume a case in which by the direction-path selection of the first optical-path selection switch 71, a direction path is selected through which the optical signals inputted from the input port $P_{IN}$ are transmitted to the first optical-path setting switch 81. In this case, since the optical signals are inputted to the first optical-path setting switch 81, the first optical-path setting switch 81 outputs the inputted optical signals to one of the optical transceivers 30B1 and 30B2 having regeneration relay functions.

The optical transceiver 30B1 or 30B2 converts the inputted optical signals into electrical signals by optical-electrical conversion, then further converts the electrical signals by electrical-optical conversion to generate optical signals, and outputs the optical signal to the second optical-path setting switch 82. The second optical-path setting switch 82 outputs the optical signals from the optical transceiver 30B1 or 30B2 to the output port $P_{OUT}$ of each of the second optical-path selection switches 72 at a desired location.

Assumes a case in which by the direction-path selection of the second optical-path selection switch 72, the direction path is selected through which signals according to the output of the electrical signals from the network processor 20B are transmitted to the optical transceiver 30B. In this case, when the electrical signals are transmitted to the optical transceiver 30B, optical signal generated by electrical-optical conversion are outputted from the output port $P_{OUT}$. Next, assume a case in which by the direction-path selection of the second optical-path selection switch 72, a direction path is selected through which optical signals inputted from an input port $P_{IN}$ different from the paired input port $P_{IN}$ and passing through the second optical-path setting switch 82 are transmitted. In this case, the optical signals inputted from the different input port $P_{IN}$ are outputted to the output port $P_{OUT}$ of each of the second optical-path selection switches 72 at a desired location.

In the optical and electronic integrated switch 100B of Embodiment 2, the optical transceivers 30B1 and 30B2, part of the optical transceivers, have regeneration relay functions, and the first optical-path setting switch 81 for the inward paths and the second optical-path setting switch 82 for the return paths are provided. These play roles similar to those of the optical core switch 60A of Embodiment 1, and each optical transmitter-receive 30B near the network processor 20B can perform optical communication with a signal source of a communication counterpart via each optical switch. In this optical communication, different types of optical switches, out of each optical switches, can cooperate to set the paths for one round-trip line for optical cut-through in which path selection is performed such that inputted optical signals are outputted without the intervention of the network processor 20B. This optical cut-through can be effectively performed without imposing a signal processing burden that consumes electric power on the network processor 20B. As a result, it is possible to achieve electric power reduction in the optical network to which the optical and electronic integrated switch 100B is applied as a network switch.

In addition, for the optical and electronic integrated switch 100B, the configuration in FIG. 4 makes it possible to integrate the packet switch and the optical switches to concentrate devices having similar functions in arrangement, making it possible to achieve it with low cost. Further, in the optical and electronic integrated switch 100B, integrating the packet switch and the optical switches makes it possible to achieve reduction of the communication processing time.

Embodiment 3

Figure 5:
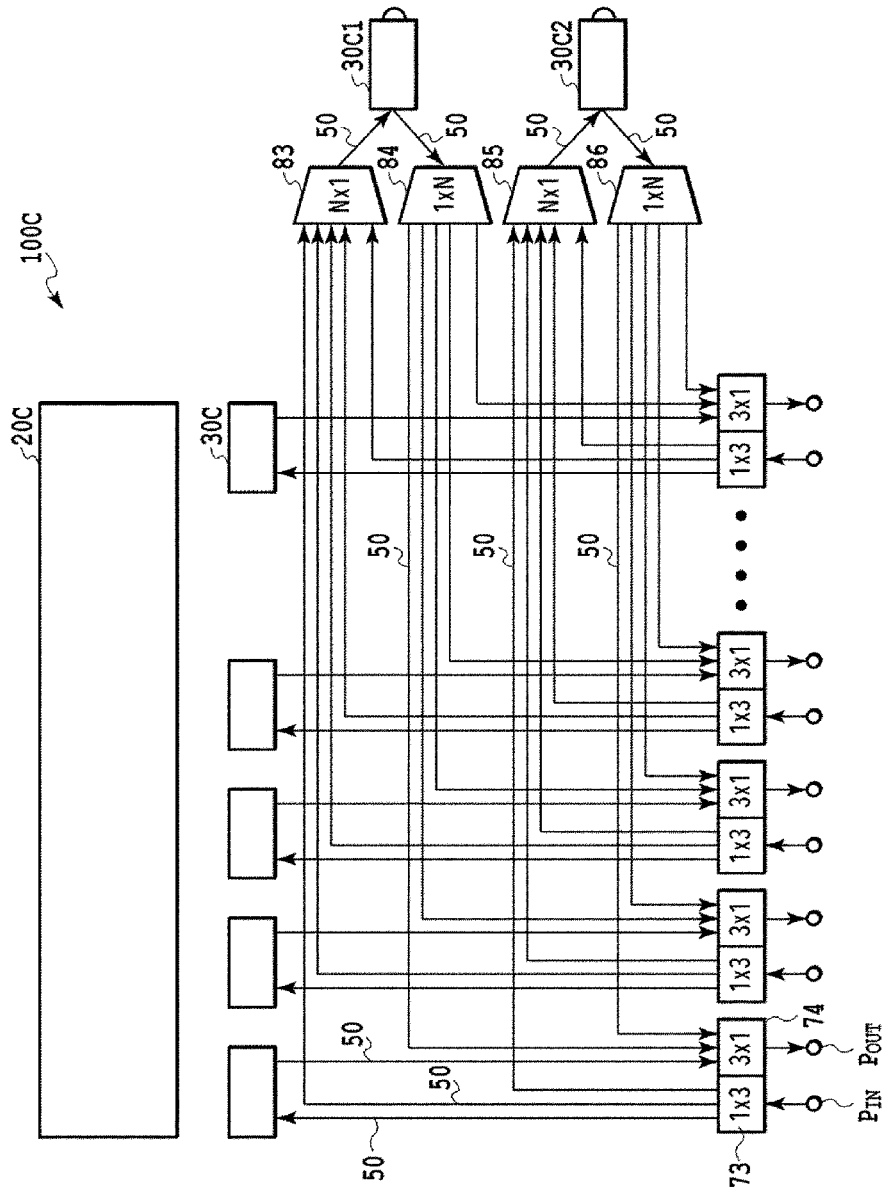
FIG. 5 is a top view diagram illustrating a schematic configuration of an optical and electronic integrated switch according to Embodiment 3 of the present invention.

FIG. 5 is a top view diagram illustrating a schematic configuration of an optical and electronic integrated switch 100C according to Embodiment 3 of the present invention.

With reference to FIG. 5, this optical and electronic integrated switch 100C includes a network processor 20C which is an electronic circuit that controls the functions of the packet switch, a plurality of optical transceivers 30C having photoelectric conversion functions, and a plurality of optical switches. The network processor 20C and each optical transceiver 30C compose the packet switch. Also in this optical and electronic integrated switch 100C, a pair of optical transceivers 30C1 and 30C2 which are part of each optical transceiver 30C are away from the network processor 20C and have a regeneration relay function that turns back inputted optical signals to the transmission side. In this optical and electronic integrated switch 100C, first optical-path setting switches 83 and 85 and second optical-path setting switches 84 and 86 are provided so as to form pairs individually associated to the optical transceivers 30C1 and 30C2 having regeneration relay functions.

Each optical switch includes a plurality of first optical-path selection switches 73 of a 1×3 type and a plurality of second optical-path selection switches 74 of a 3×1 type. Each optical switch also includes the first optical-path setting switches 83 and 85 of an N×1 type and the second optical-path setting switches 84 and 86 of a 1×N type. Also in this case, Each first optical-path selection switch 73 is connected to the input ports $P_{IN}$, and each second optical-path selection switch 74 is connected to the output ports $P_{OUT}$.

In this optical and electronic integrated switch 100C, wiring through which electrical signals pass, such as the above metal wiring, is used for the paths connecting between the network processor 20C and each optical transceiver 30C. For the paths connecting between each optical transceiver 30C and each first and each second optical-path selection switches 73 and 74, optical waveguides 50 are used. Further, the optical waveguides 50 are also used for the paths connecting between each first and each second optical-path selection switches 73 and 74 and the first optical-path setting switches 83 and 85 and second optical-path setting switches 84 and 86. In addition, the optical waveguides 50 are also used for the paths connecting between the first optical-path setting switches 83 and 85 and second optical-path setting switches 84 and 86 and the optical transceivers 30C1 and 30C2 having regeneration relay functions. In addition, the optical waveguides 50 are also used for the paths connecting between the input ports $P_{IN}$ and each first optical-path selection switch 73 and the paths connecting between the output ports $P_{OUT}$ and each second optical-path selection switch 74.

The optical transceiver 30C1 having a regeneration relay function converts the optical signals outputted from the first optical-path setting switch 83 into electrical signals by optical-electrical conversion, then, further converts the electrical signals into optical signals by electrical-optical conversion, turns back the optical signals, and outputs them to the second optical-path setting switch 84. The optical transceiver 30C2 having a regeneration relay function converts the optical signals outputted from the first optical-path setting switch 85 into electrical signals by optical-electrical conversion, then, further converts the electrical signals into optical signals by electrical-optical conversion, turns back the optical signals, and outputs them to the second optical-path setting switch 86. Each first optical-path selection switch 73 selects a direction path to determine whether to establish a direct connection via one or the other of the pair of first optical-path setting switches 83 and 85 to an output port Pour different from the paired output port $P_{OUT}$. Each second optical-path selection switch 74 selects a direction path to determine whether to output the optical signals inputted from an input port $P_{IN}$ different from the paired input port $P_{IN}$ and passing through one or the other of the pair of second optical-path setting switches 84 and 86.

Note that each first optical-path selection switch 73 can select the direction path through which optical signals inputted from the input port $P_{IN}$ pass through each optical transceiver 30C and are converted into electrical signals by optical-electrical conversion, and the electrical signals are transmitted to the network processor 20C. Each second optical-path selection switch 74 can output, from the output port $P_{OUT}$, the optical signals according to the output of the electrical signals from the network processor 20C, which are generated by being caused to pass through each optical transceiver 30C and subjected to electrical-optical conversion.

The optical and electronic integrated switch 100C according to Embodiment 3 has the first optical-path setting switches 83 and 85 for the inward paths and the second optical-path setting switches 84 and 86 for the return paths respectively associated to the optical transceivers 30C1 and 30C2 having regeneration relay functions. These play roles similar to those of the optical core switch 60A of Embodiment 1, and each optical transceiver 30C near the network processor 20C performs optical communication with a signal source of a communication counterpart via each optical switch.

Specifically, the optical and electronic integrated switch 100C has a configuration changed from the configuration in which the first optical-path setting switch 81 of an N×2 type and the second optical-path setting switch 82 of a 2×N type used in Embodiment 2 are optical switches having special input-output port numbers. In other words, it is regarded as a configuration changed so that it can be achieved with a combination of optical switches having standard input-output port numbers. The basic operation is the same as that of Embodiment 2, except that each first optical-path selection switch 73 selects the first optical-path setting switch 83 or 85 and that each second optical-path selection switch 74 selects the second optical-path setting switch 84 or 86, as described above.

In any way, also in the case of the optical and electronic integrated switch 100C of Embodiment 3, each optical transceiver 30C can perform optical communication with a signal source of a communication counterpart via each optical switch. In this optical communication, each of optical switches of different types, out of the optical switches, can cooperate to set the paths for one round-trip line for optical cut-through in which path selection is performed such that inputted optical signals are outputted without the intervention of the network processor 20C. This optical cut-through can be effectively performed without imposing a signal processing burden that consumes electric power on the network processor 20C. As a result, it is possible to achieve electric power reduction in the optical network to which the optical and electronic integrated switch 100C is applied as a network switch.

In addition, also for the optical and electronic integrated switch 100C, the configuration in FIG. 5 makes it possible to integrate the packet switch and the optical switches to concentrate devices having similar functions in arrangement, making it possible to achieve it with low cost. Further, in the optical and electronic integrated switch 100C, integrating the packet switch and the optical switches makes it possible to achieve reduction of the communication processing time.

Embodiment 4

Figure 6:
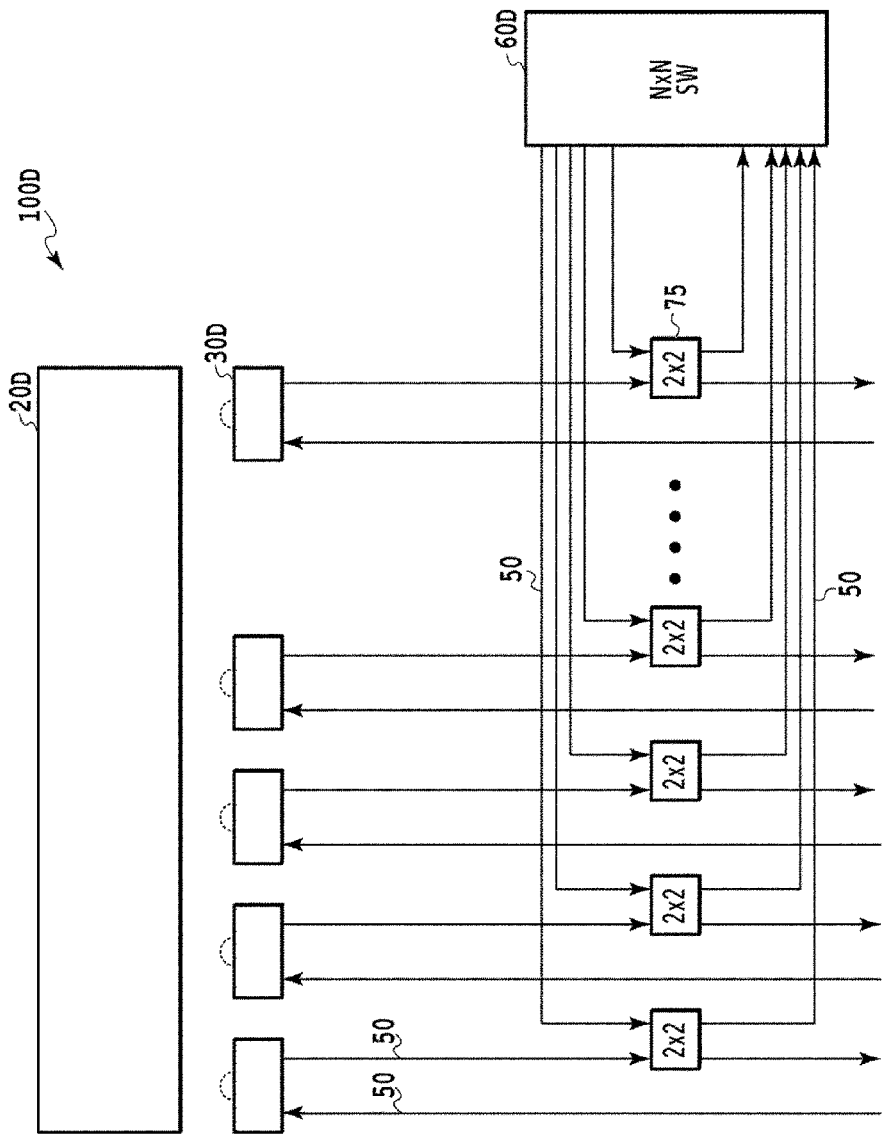
FIG. 6 is a top view diagram illustrating a schematic configuration of an optical and electronic integrated switch according to Embodiment 4 of the present invention.

FIG. 6 is a top view diagram illustrating a schematic configuration of an optical and electronic integrated switch 100D according to Embodiment 4 of the present invention.

With reference to FIG. 6, this optical and electronic integrated switch 100D includes a network processor 20D which is an electronic circuit that controls the functions of the packet switch, a plurality of optical transceivers 30D having photoelectric conversion functions, and a plurality of optical switches. The network processor 20D and each optical transceiver 30D compose the packet switch. Each optical switch includes, as different types of optical switches, an optical core switch 60D of an N×N type and a plurality of optical-path selection switches 75 of a 2×2 type.

In this optical and electronic integrated switch 100D, wiring through which electrical signals pass, such as the above metal wiring, is used for the paths connecting between the network processor 20D and each optical transceiver 30D. For the paths connecting between each optical transceiver 30D and each optical-path selection switch 75, optical waveguides 50 are used. Further, the optical waveguides 50 are also used for the paths connecting between the optical core switch 60D and each optical-path selection switch 75. Each optical transceiver 30D described here is provided near the network processor 20D and has a regeneration relay function that selectively turns inputted optical signals back to the transmission side. Note that also in this optical and electronic integrated switch 100D, it is assumed that the optical signals inputted from the input ports $P_{IN}$ are transmitted to each optical transceiver 30D, and that the optical signals outputted from each optical-path selection switch 75 are outputted through the output ports $P_{OUT}$.

Each optical transceiver 30D converts the inputted optical signals into electrical signals by optical-electrical conversion and transmits the electrical signals to the network processor 20D. Each optical transceiver 30D can select whether it converts the electrical signals outputted from the network processor 20D into optical signals by electrical-optical conversion, and outputs the optical signals, or whether it converts the inputted optical signals into electrical signals by optical-electrical conversion, turns back the electrical signals, converts them into optical signals by electrical-optical conversion, and outputs the optical signals. Each optical transceiver 30D has the selection function as above.

Each optical-path selection switch 75 is provided between the corresponding input port $P_{IN}$ and the corresponding each optical transceiver 30D or between the corresponding each optical transceiver 30D and the corresponding output port $P_{OUT}$. Each of the optical-path selection switches 75 can function as a through connection to connect the input port $P_{IN}$ or output port $P_{OUT}$ to each optical transceiver 30D. Each optical-path selection switch 75 can also function as a cross connection to connect the input port $P_{IN}$ or output port $P_{OUT}$ to the optical core switch 60D and connect the optical transceiver 30D to the optical core switch 60D. Each optical-path selection switch 75 having the selection function as above is of a 2×2 type and has a function of establishing a cross connection to transmit optical signals to the optical core switch 60D.

In this optical and electronic integrated switch 100D, after converting inputted optical signals into electrical signals by optical-electrical conversion, each optical transceiver 30D transmits the electrical signals to the network processor 20D or turns back the electrical signals, performs electrical-optical conversion, and outputs the resultant signals. In the case in which electrical signals are transmitted to the network processor 20D, each optical-path selection switch 75 functions as a through connection, and thus the network processor 20D is connected to the input port $P_{IN}$ and the output port $P_{OUT}$ via each optical transceiver 30D. In the case of turning back the electrical signals, performing electrical-optical conversion, and outputting the resultant signals, each optical-path selection switch 75 functions as a cross connection, the signals inputted from the input port $P_{IN}$ are transmitted to the optical core switch 60D, the optical core switch 60D sends out the optical signals to each optical-path selection switch 75 at a desired location, and the optical signals are outputted from the output port $P_{OUT}$. In the course of this operation, the optical signals are regenerated and relayed.

In the optical and electronic integrated switch 100D of Embodiment 4, each optical transceiver 30D has a regeneration relay function that turns back optical signals and can perform optical communication with a signal source of a communication counterpart via each optical switch. In this optical communication process, different types of optical switches, out of each optical switch, can cooperate to set the paths for optical cut-through in which path selection is performed such that inputted optical signals are outputted without the intervention of the network processor 20D. This optical cut-through can be effectively performed without imposing a signal processing burden that consumes electric power on the network processor 20D. As a result, it is possible to achieve electric power reduction in the optical network to which the optical and electronic integrated switch 100D is applied as a network switch.

In addition, for the optical and electronic integrated switch 100D, the configuration in FIG. 6 makes it possible to integrate the packet switch and the optical switches to concentrate devices having similar functions in arrangement, making it possible to achieve it with low cost. Further, in the optical and electronic integrated switch 100D, integrating the packet switch and the optical switches makes it possible to achieve reduction of the communication processing time.

The invention claimed is:

1. An optical and electronic integrated switch comprising a packet switch, a plurality of optical switches, and a plurality of paired input ports and output ports, wherein
   the packet switch includes an electronic circuit and a plurality of optical transceivers provided near the electronic circuit and having a photoelectric conversion function,
   the plurality of optical switches include different types of optical switches,
   paths connecting between the electronic circuit and the plurality of optical transceivers are formed of wiring through which an electrical signal passes,
   paths connecting between the plurality of optical transceivers and the plurality of optical switches, paths connecting between two optical switches of the different types out of the plurality of optical switches, and paths connecting between the plurality of optical switches and an input-output port of the optical and electronic integrated switch are formed of optical waveguides, and
   the optical switches of the different types out of the plurality of optical switches cooperate to perform path selection such that an inputted optical signal is outputted without intervention of the electronic circuit, the plurality of optical switches include an optical core switch, a plurality of first optical-path selection switches, and a plurality of second optical-path selection switches, each of the first optical-path selection switches selects a direction to determine whether to pass an optical signal inputted from a corresponding one of the input parts through a corresponding one of the optical transceivers to convert the optical signal into an electrical signal by optical-electrical conversion and transmit the electrical signal to the electronic circuit, or whether to directly connect the optical signal inputted from the corresponding one of the input ports via the optical core switch to an output port different from a paired one of the output ports, and each of the second optical-path selection switches selects a direction to determine whether to pass an electrical signal outputted from the electronic circuit through the corresponding one of the optical transceivers to convert the electrical signal into an optical signal by electrical-optical conversion and output the optical signal, or whether to output an optical signal inputted from an input port different from a paired one of the input ports and passing through the optical core switch.

2. The optical and electronic integrated switch according to claim 1, wherein at least some of the optical transceivers are away from the electronic circuit and have a regenerative function that converts an inputted optical signal into an electrical signal by optical-electrical conversion, turns back the electrical signal and converts the electrical signal into an optical signal by electrical-optical conversion, and outputs the optical signal.

3. The optical and electronic integrated switch according to claim 1, wherein each of the optical switches is a waveguide optical switch fabricated using a planar lightwave circuit (PLC) technique, the electronic circuit, the plurality of optical transceivers, the plurality of optical switches, the wiring, and the optical waveguides are formed on an upper surface of one and the same substrate, the wiring and the optical waveguides compose an interposer with optical waveguides, and the electronic circuit, the plurality of optical transceivers, and the plurality of optical switches are arranged, in the formed state, on one and the same plane of an upper surface of the interposer with optical waveguides.

4. The optical and electronic integrated switch according to claim 3, wherein one or all of the optical switches are integrated as part of the optical waveguides in the interposer with optical waveguides.

5. An optical and electronic integrated switch comprising a packet switch, a plurality of optical switches, and a plurality of paired input ports and output ports, wherein the packet switch includes an electronic circuit and a plurality of optical transceivers provided near the electronic circuit and having a photoelectric conversion function, the plurality of optical switches include different types of optical switches, paths connecting between the electronic circuit and the plurality of optical transceivers are formed of wiring through which an electrical signal passes, paths connecting between the plurality of optical transceivers and the plurality of optical switches, paths connecting between two optical switches of the different types out of the plurality of optical switches, and paths connecting between the plurality of optical switches and an input-output port of the optical and electronic integrated switch are formed of optical waveguides, and the optical switches of the different types out of the plurality of optical switches cooperate to perform path selection such that an inputted optical signal is outputted without intervention of the electronic circuit, the plurality of optical switches include an optical core switch and a plurality of optical-path selection switches, each of the optical transceivers has a selection function for selecting whether to convert an inputted optical signal into an electrical signal by optical-electrical conversion, transmit the electrical signal to the electronic circuit, convert an electrical signal outputted from the electronic circuit into an optical signal by electrical-optical conversion, and output the optical signal, or whether to convert the inputted optical signal into an electrical signal by optical-electrical conversion, turn back the electrical signal and convert the electrical signal into an optical signal by electrical-optical conversion, and output the optical signal, each of the optical-path selection switches is provided between a corresponding one of the input ports and a corresponding one of the optical transceivers or between the corresponding one of the optical transceivers and a corresponding one of the output ports, and functions as a through connection to connect the input port or the output port to the corresponding one of the optical transceivers, or functions as a cross connection to connect the input port or the output port to the optical core switch or connect the corresponding one of the optical transceivers to the optical core switch, and the optical core switch outputs the transmitted optical signal to one of the optical-path selection switches at a desired location.

6. An optical and electronic integrated switch comprising a packet switch, a plurality of optical switches, and a plurality of paired input ports and output ports, wherein the packet switch includes an electronic circuit and a plurality of optical transceivers provided near the electronic circuit and having a photoelectric conversion function, the plurality of optical switches include different types of optical switches, paths connecting between the electronic circuit and the plurality of optical transceivers are formed of wiring through which an electrical signal passes, paths connecting between the plurality of optical transceivers and the plurality of optical switches, paths connecting between two optical switches of the different types out of the plurality of optical switches, and paths connecting between the plurality of optical switches and an input-output port of the optical and electronic integrated switch are formed of optical waveguides, and the optical switches of the different types out of the plurality of optical switches cooperate to perform path selection such that an inputted optical signal is outputted without intervention of the electronic circuit, at least some of the optical transceivers are away from the electronic circuit and have a regenerative function that converts an inputted optical signal into an electrical signal by optical-electrical conversion, turns back the electrical signal and converts the electrical signal into an optical signal by electrical-optical conversion, and outputs the optical signal, the plurality of optical switches include a plurality of first optical-path selection switches, a plurality of second optical-path selection switches, a first optical-path setting switch, and a second optical-path setting switch, each of the first optical-path selection switches selects a direction to determine whether to pass the optical signal inputted from a corresponding one of the input ports through a corresponding one of the optical transceivers not having the regenerative function to convert the optical signal into an electrical signal by optical-electrical conversion and transmit the electrical signal to the electronic circuit, or whether to directly connect the optical signal inputted from the corresponding one of the input ports via the first optical-path setting switch to an output port different from a paired one of the output ports, each of the second optical-path selection switches selects a direction to determine whether to pass an electrical signal outputted from the electronic circuit through the corresponding one of the optical transceivers not having the regenerative function to convert the electrical signal into an optical signal by electrical-optical conversion and output the optical signal or whether to output an optical signal inputted from an input port different from a paired one of the input ports and passing through the second optical-path setting switch, the first optical-path setting switch receives the optical signal selected by each of the first optical-path selection switches and outputs the optical signal to the optical transceiver having the regeneration relay function, and the second optical-path setting switch outputs the optical signal turned back by the optical transceiver having the regenerative function to one of the second optical-path selection switches at a desired location.

7. The optical and electronic integrated switch according to claim 5, wherein the first optical-path setting switch and the second optical-path setting switch are paired and provided individually to the optical transceiver having the regenerative function, the optical transceiver having the regenerative function, when receiving the optical signal outputted from the first optical-path setting switch, turns back the optical signal and outputs the optical signal to the second optical-path setting switch, each of the first optical-path selection switches selects a direction to determine whether to directly connect via one or the other of the paired first optical-path setting switches to an output port different from the paired output port, and each of the plurality of second optical-path selection switches selects a direction to determine whether to output an optical signal inputted from an input port different from the paired input port and passing through one or the other of the paired second optical-path setting switches.

* * * * *